US009697782B2

(12) United States Patent
Liu et al.

(10) Patent No.: US 9,697,782 B2
(45) Date of Patent: Jul. 4, 2017

(54) POLARITY REVERSAL DRIVING METHOD FOR LIQUID CRYSTAL DISPLAY PANEL, AND APPARATUS THEREOF

(75) Inventors: Jinliang Liu, Beijing (CN); Xiujian Zhu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 565 days.

(21) Appl. No.: 13/479,671

(22) Filed: May 24, 2012

(65) Prior Publication Data

US 2012/0299884 A1 Nov. 29, 2012

(30) Foreign Application Priority Data

May 25, 2011 (CN) .......................... 2011 1 0137048

(51) Int. Cl.
*G06F 3/038* (2013.01)
*G09G 3/36* (2006.01)

(52) U.S. Cl.
CPC ... *G09G 3/3614* (2013.01); *G09G 2320/0209* (2013.01); *G09G 2320/0247* (2013.01)

(58) Field of Classification Search
CPC .................................................... G09G 3/3614
USPC .................................... 345/204–211, 87–104
See application file for complete search history.

(56) References Cited

U.S. PATENT DOCUMENTS

| | | | | |
|---|---|---|---|---|
| 8,102,351 | B2 | 1/2012 | Tang | |
| 2002/0089485 | A1 | 7/2002 | Youn | |
| 2005/0104834 | A1* | 5/2005 | Tsuchihashi | 345/96 |
| 2005/0206596 | A1 | 9/2005 | Chen et al. | |

(Continued)

FOREIGN PATENT DOCUMENTS

| | | |
|---|---|---|
| CN | 1530723 A | 9/2004 |
| CN | 1619400 A | 5/2005 |

(Continued)

OTHER PUBLICATIONS

First Chinese Office Action date Apr. 28, 2013; Appln. No. 201110137048.3.

(Continued)

*Primary Examiner* — Kwin Xie
(74) *Attorney, Agent, or Firm* — Ladas & Parry LLP

(57) ABSTRACT

The invention discloses a polarity reversal driving method for liquid crystal display panel and an apparatus thereof, wherein a polarity reversal driving period comprises four frames and any one of the four frames may be a start frame, and images are scanned and displayed in a forward or backward order of the four frames; wherein during the polarity reversal driving period, the polarity arrangement manners of a first frame and a third frame are same, while their polarities are opposite; the polarity arrangement manners of a second frame and a fourth frame are same, while their polarities are opposite, and the polarity arrangement manner of the first frame is different from that of the second frame. The driving method designed by the present invention can lighten the flicker and crosstalk phenomenon arisen when the liquid crystal display panel displays some pictures.

7 Claims, 10 Drawing Sheets

(56) References Cited

U.S. PATENT DOCUMENTS

| | | | | |
|---|---|---|---|---|
| 2006/0193002 | A1* | 8/2006 | Satou | G09G 3/3688 358/1.15 |
| 2006/0279506 | A1 | 12/2006 | Choi | |
| 2006/0279514 | A1 | 12/2006 | Yokota et al. | |
| 2007/0046610 | A1 | 3/2007 | Okuzono | |
| 2008/0088615 | A1 | 4/2008 | Chen et al. | |
| 2010/0315402 | A1* | 12/2010 | Hashimoto | 345/211 |
| 2012/0293495 | A1 | 11/2012 | Yeo et al. | |

FOREIGN PATENT DOCUMENTS

| | | | | |
|---|---|---|---|---|
| CN | 101334975 | A | | 12/2008 |
| CN | 101424805 | A | * | 5/2009 |
| CN | 102629453 | A | | 8/2012 |
| JP | 6-271932 | A | | 4/1987 |
| JP | 62-71932 | A | | 4/1987 |
| KR | 20010004914 | A | | 1/2001 |

OTHER PUBLICATIONS

Patent Grant Notification issued Mar. 26, 2014; Appln. No. 201110137048.3.

Allowed Claims CN201110137048.3.

First Chinese Office Action dated Apr. 28, 2013 Appln. No. 201110137048.3.

Second Chinese Office Action dated Dec. 25, 2013; Appln. No. 201110137048.3.

Second Chinese Office Action dated Dec. 25, 2013; Appln. No. 201110137048I.3.

International Search Report mailed Jan. 23, 2014; PCT/CN2013/077411.

Second Chinese Office Action dated Feb. 4, 2015; Appln. No. 201310130258.9.

International Preliminary Report on Patentability issued Oct. 20, 2015; PCT/CN2013/077411.

USPTO NFOA dated Jul. 11, 2016 in connection with U.S. Appl. No. 14/381,111.

* cited by examiner

POLARITY REVERSAL DRIVING METHOD FOR LIQUID CRYSTAL DISPLAY PANEL, AND APPARATUS THEREOF

FIELD OF THE INVENTION

The present invention relates to a polarity reversal driving method for liquid crystal display panel, and an apparatus thereof.

BACKGROUND

With a development of economy and technology, a display, especially a liquid crystal flat display apparatus, is more popular in an application of a computer, a mobile device, a multimedia and a TV display, etc. In order to reduce a picture flicker and crosstalk caused by direct current afterimage during a driving display process of the liquid crystal and fluctuations in a common voltage arising from a coupling to a common electrode from signal lines, the current driving manners in most of the liquid crystal panels utilize a dot reversal, 2-dot reversal, and a (1+2)-dot reversal as the polarity reversal method. At a time of displaying some special evaluation patterns, the common voltage would not return to a normal value when the next frame starts if a coupling effect to the common electrode by the data signals is large, such that the flicker in the picture or the crosstalk in several initial rows of the picture is serious; also, during a scan process for the same frame, the crosstalk phenomenon in the picture of entire screen is very serious, if the coupling effect to the common electrode by the data signals is large and a polarity reversal frequency among rows is relatively high.

In FIG. 1, a) and b) are two display patterns under a driving method of an existing 1+2 dot reversal. In view of a TN normal-white mode, assuming a voltage difference between a sub-pixel electrode and the common electrode in non-shadow region as 0V and that in shadow region as 1V. For a) in FIG. 1, the voltage Vcom of the common electrode in the current frame is pulled-up, but the Vcom could not return to the normal value at the time of the next frame reversing polarity, which causes an actual voltage difference between the liquid crystal pixel electrode in the next frame and the voltage Vcom being increased, such that a transmittance of LC (liquid crystal) is below a predetermined value and a flicker occurs in two neighbor frames. For b) in FIG. 1, the date signals in part of the rows pull up the voltage Vcom while the data signals in another part of the rows pull down the voltage Vcom in a same frame, therefore such process for pulling the Vcom from up to down or from down to up would influence an effective voltage input of the pixels in the next row. As illustrated in b) of FIG. 1, the Vcom is pulled-up at the first row, therefore the voltage difference between the pixel voltage of sub-pixel G and the Vcom is smaller than a predetermined value, while the voltage differences between the pixel voltage of sub-pixels R, B and the Vcom are larger than a predetermined value, respectively, when the pixel signals of the second row is written, which would cause the sub-pixel G is brighter but the sub-pixels R and B are darker, such that a green crosstalk or color offset may be generated. The frequency of pulling the Vcom up/down from respective rows in the same frame is higher, the phenomenon of green crosstalk or color offset is severer.

In FIG. 2, A, B, C and D illustrate several common-used display patterns for evaluating the flicker and crosstalk currently. In the existing polarity reversal driving method, there is always one of the patterns which would deteriorate the phenomenon of flicker or crosstalk obviously.

SUMMARY

Embodiments of the present invention lighten the flicker and crosstalk phenomenon arisen when the liquid crystal display panel is driven to display some special pictures.

The embodiment of the present invention provides a polarity reversal driving method for liquid crystal display panel, which makes four frames as a polarity reversal driving period and any one of the four frames may be a start frame, and images are scanned and displayed in a forward or backward order of the four frames; wherein during the polarity reversal driving period, the polarity arrangement manners of a first frame and a third frame are same, while their polarities are opposite; the polarity arrangement manners of a second frame and a fourth frame are same, while their polarities are opposite, and the polarity arrangement manner of the first frame is different from that of the second frame.

In one embodiment, the polarity arrangement manner of each frame is repeated by a period of eight rows, and the sum of polarities in a first unit composed of a first row, a second row, a third row, and a fourth row and those in a second unit composed of a fifth row, a sixth row, a seventh row, and a eighth row is 0 in a same column, and neighbor columns in a same row have opposite polarities.

In one embodiment, the polarity arrangement manner in the first column of one polarity arrangement period is negative, positive, positive, negative, positive, negative, negative, and positive.

In one embodiment, the polarity arrangement manner in the first column of one polarity arrangement period is positive, negative, positive, negative, negative, positive, negative, and positive.

In one embodiment, the polarity arrangement manner in the first column of one polarity arrangement period is negative, positive, positive, negative, positive, positive, negative, and negative.

In one embodiment, the polarity arrangement manner in the first column of one polarity arrangement period is positive, positive, negative, negative, negative, positive, negative, and positive. The polarity is a polarity with respect to a pixel common electrode voltage.

The embodiment of the present invention further provides a polarity reversal driving apparatus for the liquid crystal display panel comprising: a timing controller, a signal delay unit, a polarity reversal unit, a signal polarity switching switch and a source driver;

the signal delay unit is configured to receive a first polarity reversal signal POL1 and a timing signal clock CPV output from the timing controller so as to generate a second polarity reversal signal POL2;

the polarity reversal unit is configured to receive the second polarity reversal signal POL2 output from the signal delay unit so as to generate a third polarity reversal signal POL3;

the signal polarity switching switch is configured to alternatively switch the second polarity reversal signal POL2 and the third polarity reversal signal POL3 according to a high, low level of a first switching pulse and a second switching pulse output from the timing controller, to generate a fourth polarity reversal signal POL4 and output the same to the source driver, wherein the periods of both the first switching pulse and the second switching pulse are same as the polarity arrangement period, and the fourth polarity reversal signal POL4 is used for controlling signal output polarities of respective frames during one polarity reversal driving period as scanning;

the timing controller is configured to output the first polarity reversal signal POL1 and the timing signal clock CPV, to alternatively output the first switching pulse and the second switching pulse in a unit of frame, and to perform polarity reversal once upon the next outputting, in order to correspond to the generation and output of the fourth polarity reversal signal POL4 of respective frames in the four frames within the polarity reversal driving period;

the source driver is configured to output image data signals with positive polarity or negative polarity according to the high level or low level of the fourth polarity reversal signal POL4, respectively, when it receives the signal POL4.

In one embodiment, a corresponding manner is that: the second polarity reversal signal POL2 is selected when both the first switching pulse and the second switching pulse are at a high level; instead, the third polarity reversal signal POL3 is selected when both the first switching pulse and the second switching pulse are at a low level.

The embodiment of the present invention further provides another polarity reversal driving apparatus for the liquid crystal display panel comprising: a timing controller, a signal delay unit, a logic operating unit, a first signal polarity switching switch, a second signal polarity switching switch and a source driver;

the signal delay unit is configured to receive a first polarity reversal signal POL1 and a timing signal clock CPV output from the timing controller so as to generate a second polarity reversal signal POL2;

the logic operating unit is configured to receive the second polarity reversal signal POL2 output from the signal delay unit and the first polarity reversal signal POL1 output from the timing controller so as to generate a third polarity reversal signal POL3;

the first signal polarity switching switch is configured to alternatively switch the second polarity reversal signal POL2 and the first polarity reversal signal POL1 according to a high, low level of a first switching pulse output from the timing controller, to generate a fourth polarity reversal signal POL4 and output the same to the source driver, in order to control signal output polarities of the first frame;

the second signal polarity switching switch is configured to alternatively switch the first polarity reversal signal POL1 and the third polarity reversal signal POL3 according to a high, low level of a second switching pulse output from the timing controller, to generate a fifth polarity reversal signal POL5 and output the same to the source driver, in order to control signal output polarities of the second frame;

the timing controller is configured to output the first polarity reversal signal POL1 and the timing signal clock CPV, and to alternatively output the first switching pulse and the second switching pulse in a unit of frame, wherein the periods of the first switching pulse and the second switching pulse are same as the polarity arrangement period;

the source driver is configured to output image data signals with positive polarity or negative polarity according to the high level or low level of the fourth polarity reversal signal POL4 and the fifth polarity reversal signal POL5, respectively, after it receives the fourth polarity reversal signal POL4 and the fifth polarity reversal signal POL5.

The embodiments of the present invention lightens the flicker and crosstalk phenomenon arisen when the liquid crystal display panel is driven to display some special pictures by the designed polarity reversal driving method.

Figure 1:
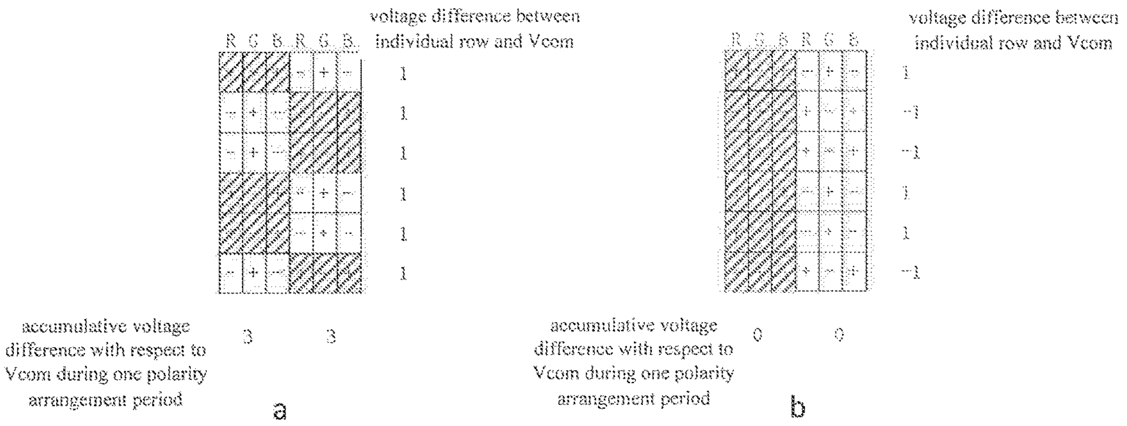
In FIG. 1, a) is a schematic view wherein the flickering pattern is displayed by existed polarity reversal driving method, while b) is a schematic view wherein a green crosstalk or color offset is displayed by the existing polarity reversal driving method.

In the drawings, reference numbers 1, 2, 3, 4 and 5 denote one polarity reversal period of the first implementation, the second implementation, the third implementation, the fourth implementation and the fifth implementation of the present invention, respectively; a reference number 11 denotes the polarity arrangement period of the first frame in the first implementation, and reference numbers 111 and 112 denote the first unit and the second unit during the polarity arrangement period of the first frame, respectively, a reference number 12 denotes the polarity arrangement period of the second frame in the first implementation, and reference numbers 121 and 122 denote the first unit and the second unit during the polarity arrangement period of the second frame, respectively; reference numbers 101, 102, 103, 104 and 105 denote the timing controller, the signal delay unit, the polarity reversal unit, the signal polarity switching switch and the source driver of the first implementation; a reference number 21 denotes the polarity arrangement period of the first frame in the second implementation, and reference numbers 211 and 212 denote the first unit and the second unit during the polarity arrangement period of the first frame, respectively, a reference number 22 denotes the polarity arrangement period of the second frame in the second implementation, and reference numbers 221 and 222 denote the first unit and the second unit during the polarity arrangement period of the second frame, respectively; reference numbers 201, 202, 206, 204-1, 204-2 and 205 denote the timing controller, the signal delay unit, the logic operating unit, the first signal polarity switching switch, the second signal polarity switching switch and the source driver of the second implementation.

DETAILED DESCRIPTION

Below detailed implementations of the invention will be described in further details in connection with the accompanying drawings and embodiments. The following embodiments are only used to illustrate the invention, but not intend to limit the scope of the invention.

First Implementation

Figure 3:
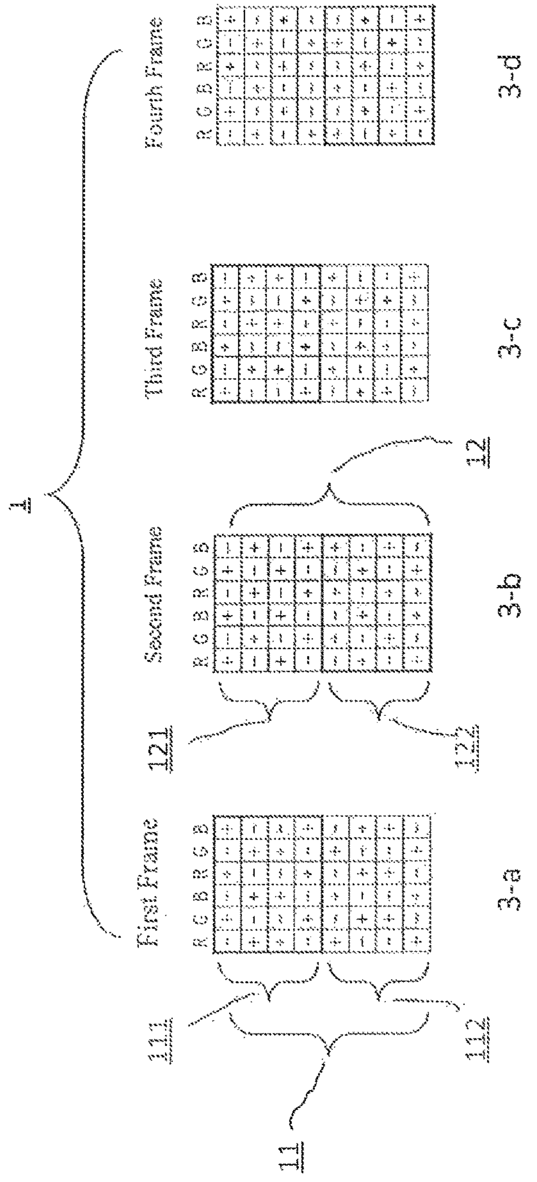
In FIG. 3, 3-*a* to 3-*d* are schematic views illustrating the frame polarity reversal manner of a first implementation of the present invention.

FIGS. 3-8 illustrate the first implementation of the present invention. FIG. 3 illustrates that four frames constitute one polarity reversal driving period (marked as 1) in a process for driving the liquid crystal display panel, that is, FIGS. 3-*a*, 3-*b*, 3-*c* and 3-*d* correspond to the polarity arrangement manners in the first frame, the second frame, the third frame and the fourth frame, respectively. Wherein the first frame (FIG. 3-*a*) and the third frame (FIG. 3-*c*) have the same polarity arrangement manners and opposite polarities; the second frame (FIG. 3-*b*) and the fourth frame (FIG. 3-*d*) have the same polarity arrangement manners and opposite polarities; and the polarity arrangement manners in FIG. 3-*a* and FIG. 3-*b* are different. In the first frame, as shown in FIG. 3-*a*, the polarity arrangement manner is repeated in a period of eight rows (marked as 11) in a portrait direction (paralleled to a data signal line), wherein the first row to the fourth row compose a first unit 111, and the fifth row to the eighth row compose a second unit 112. For the first unit 111, the polarity arrangement in a same column (such as a red sub-pixel column R (the first column)) is negative, positive, positive, negative, and for the second unit 112, the polarity arrangement in a same column (such as a red sub-pixel column R (the first column)) is positive, negative, negative, positive. The polarities of the first unit 111 and the second unit 112 in the same column are summed to zero, while the polarities of neighbor sub-pixels in a same row are opposite. In the second frame, as shown in FIG. 3-*b*, the polarity arrangement manner is repeated in a period of eight rows (marked as 12) in a portrait direction (paralleled to the data signal line), wherein the first row to the fourth row compose a first unit 121, and the fifth row to the eighth row compose a second unit 122. For the first unit 121, the polarity arrangement in a same column (such as a red sub-pixel column R (the first column)) is positive, negative, positive, negative, and for the second unit 122, the polarity arrangement in a same column (such as a red sub-pixel column R (the first column)) is negative, positive, negative, positive. The polarities of the first unit 121 and the second unit 122 in the same column are summed to zero, while the polarities of neighbor sub-pixels in a same row are opposite. The polarity arrangements in the third frame and the fourth frame may be acquired by reversing the polarity arrangements of the first frame and the second frame, respectively.

Figure 4:
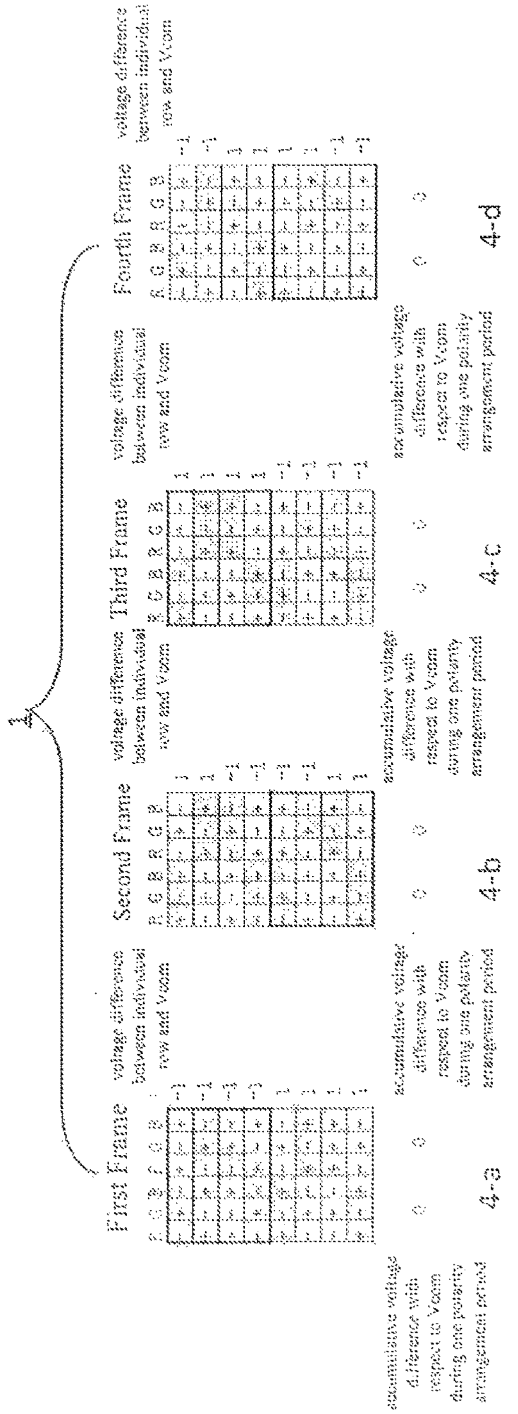
In FIG. 4, 4-*a* to 4-*d* are schematic views illustrating a polarity analysis of data signals in respective frames with respect to the common electrode voltage during one polarity reversal driving period, when an evaluation pattern B is displayed by the first implementation of the present invention.

FIG. 4 illustrates a coupling effect of the polarities of data signal voltages with respect to the common electrode voltage Vcom on the Vcom, when an existing evaluation pattern B is displayed on the liquid crystal panel utilizing the driving method of the first implementation of the present invention. Assuming that the liquid crystal panel is a TN-type normal-white mode display, a voltage difference between the sub-pixels in non-shadow regions and the common electrode voltage Vcom is 0V, while the voltage difference between the sub-pixels in shadow regions and the common electrode voltage Vcom is 1V. During the scanning display of the first frame, the effects integrated by pulling-up and pulling-down the Vcom from the data signals balance with each other in each of the polarity arrangement periods, and the Vcom does not deviate from the normal level value, so that the driving voltage of the liquid crystal on pixels may not deviate from a set value at a time of scanning in next frame and in turn no flickering phenomenon will occur. Similarly, there are no net pulling effects on the Vcom during the scanning display of the second frame, the third frame and the fourth frame, therefore no flickering would occur in the entire polarity reversal frame period. Furthermore, no flickering phenomenon would occur for other evaluation patterns A, C, D, etc. shown in FIG. 2. However, in the polarity arrangement manners of existing dot reversal (1 dot), (1+2)-dot reversal and 2-dot reversal, the driving methods thereof are polarity reversal between two neighbor frames, such that there are always data signals in one of the evaluation patterns A, B, C and D shown in FIG. 2 which will generate a large pulling to the common electrode voltage Vcom. If the polarity of data signals in current frame is positive with respect to Vcom, the Vcom is pulled-up badly and the Vcom could not return to the normal set value even after the polarity reversal in the next frame. Thus, an actual writting voltage of the sub-pixel increases, which results in an obvious difference in liquid crystal transmittance between the two neighbor frames and causes a severe flicker. That is to say, the larger the amplitude of polarity difference between data signals of two neighbor frames with respect to the Vcom is, the severer the flicker caused by the coupling is. Table 1 shows the polarity differences between data signals of two neighbor frames with respect to the Vcom during one polarity arrangement period, when the driving method of an embodiment of the present invention (the first implementation) and the existing driving method are used, respectively.

TABLE 1

| Evaluation Pattern | polarity difference between signals of two neighbor frames with respect to Vcom during one polarity arrangement period (absolute value) First Implementation | 1 dot | 1 + 2 dot | 2 dot |
|---|---|---|---|---|
| Pattern A | 0 | 16 | 0 | 0 |
| Pattern B | 0 | 0 | 16 | 0 |
| Pattern C | 0 | 0 | 0 | 16 |
| Pattern D | 0 | 0 | 0 | 0 |
| Max | 0 | 16 | 16 | 16 |

Figure 5:
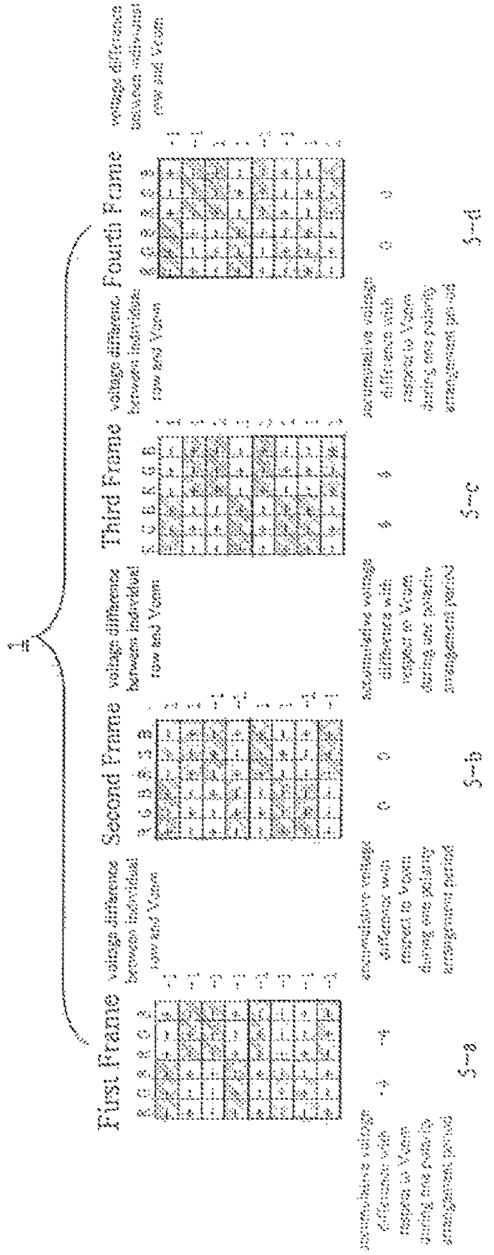
In FIG. 5, 5-*a* to 5-*d* are schematic views illustrating a polarity analysis of data signals in respective frames with respect to the common electrode voltage during one polarity reversal driving period, when a severest flickering pattern of FIG. 3-*a*) is displayed by the first implementation of the present invention.

FIG. 5 illustrates the display evaluation patterns made for the polarity arrangement manner (FIG. 3-*a*) of the first frame in one polarity arrangement driving period of an embodiment of the present invention. In the current frame, a pulling with negative polarity with respect to the common electrode voltage Vcom is generated, an accumulative magnitude effect in one polarity arrangement period is −8V, and an average effect on each of the rows is −1V; when the pattern is scanned and displayed during the second frame, the accumulative magnitude effect on the common electrode voltage Vcom in one polarity arrangement period is 0V, and the average effect on each of the rows is 0V, that is, the Vcom is not pulled during the scan and display of the second frame; as such, the accumulative effect on the common electrode voltage Vcom from the data signals in one polarity arrangement period is 8V and 0V, respectively, when the pattern is scanned and displayed during the third frame and the fourth frame. Therefore, in one polarity reversal driving period, a maximum magnitude of the polarity difference between data signals of two neighbor frames with respect to the Vcom is 8V in one polarity arrangement period, which is half of the severest polarity difference magnitude of 16V in the existing polarity reversal driving method, thus a degree of the flicker decreases.

Figure 2:
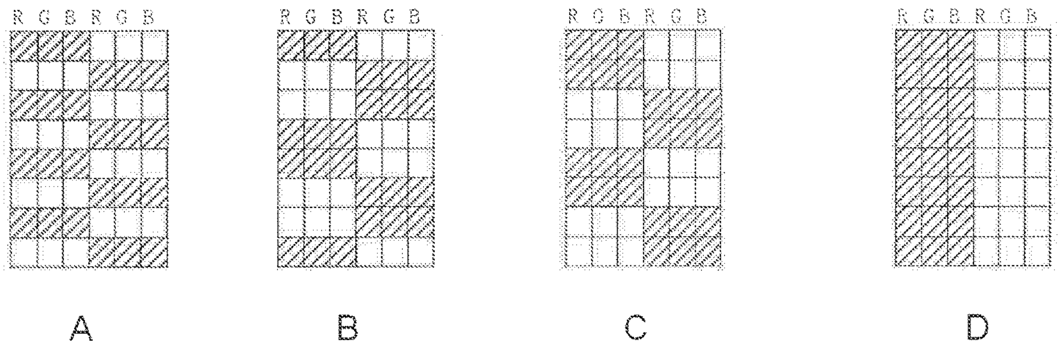
In FIG. 2, A, B, C and D are schematic views of common-used patterns for evaluating the flicker and green crosstalk or color offset in the liquid crystal display panel, respectively.
Figure 6:
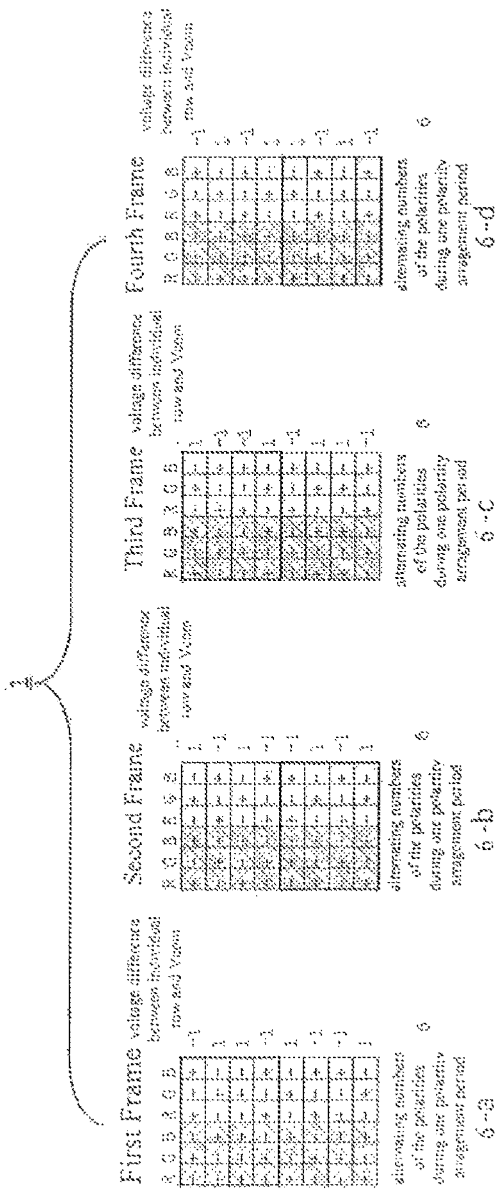
In FIG. 6, 6-*a* to 6-*d* are schematic views illustrating a coupling effect analysis of data signals in respective frames with respect to the common electrode voltage during one polarity reversal period, when an evaluation pattern D is displayed by the first implementation of the present invention.

FIG. 6 illustrates a schematic view wherein the evaluation pattern D shown in FIG. 2 is displayed by the driving method of an embodiment of the present invention. As illustrated in FIG. 6, all of change numbers between the positive pulling and the negative pulling on the Vcom by data signals with respect to the Vcom voltage in the first frame, the second frame, the third frame and the fourth frame are 6 during one polarity arrangement period, and the average change number between the positive pulling and the negative pulling in each of the frames is also 6. On the contrary, in the existing reversal driving method, the dot reversal manner causes the severest crosstalk and its change number between the positive pulling and the negative pulling for the Vcom by data signals is 8 during one polarity arrangement period, when the evaluation pattern is displayed in the dot reversal manner; there is always one of the patterns wherein the data signals would result in the change number between the positive pulling and the negative pulling on the Vcom being 8 when the patterns are displayed in other existing reversal driving manners, which is larger than 6 of the embodiment of the present invention, thus the deterioration degree of the crosstalk may be lightened by utilizing the polarity arrangement manner and the driving method of the embodiment of the present invention. Table 2 lists statistical results of the change numbers between the positive pulling and the negative pulling on the Vcom from each of the frames in average in one polarity arrangement period, when the evaluation patterns shown in FIG. 2 are displayed by using the polarity reversal driving method of an embodiment of the present invention and the existing driving technology, respectively.

TABLE 2

| Evaluation Pattern | Average value of the polarity reversal numbers between two neighbor frames First Implementation | 1 dot | 1 + 2 dot | 2 dot |
|---|---|---|---|---|
| Pattern A | 2 | 0 | 4 | 4 |
| Pattern B | 2 | 4 | 0 | 8 |
| Pattern C | 6 | 4 | 8 | 0 |
| Pattern D | 6 | 8 | 4 | 4 |
| Max | 6 | 8 | 8 | 8 |

Figure 7:
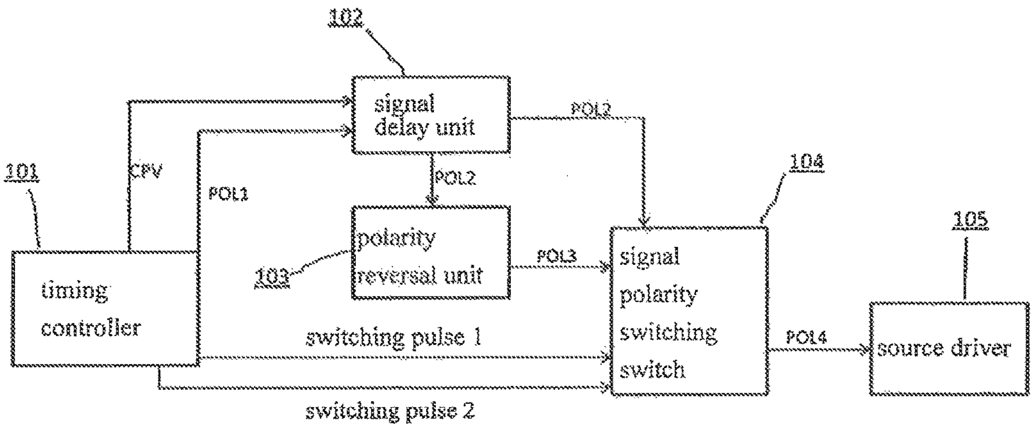
FIG. 7 is a schematic view illustrating a driving apparatus of the first implementation of the present invention.
Figure 8A:
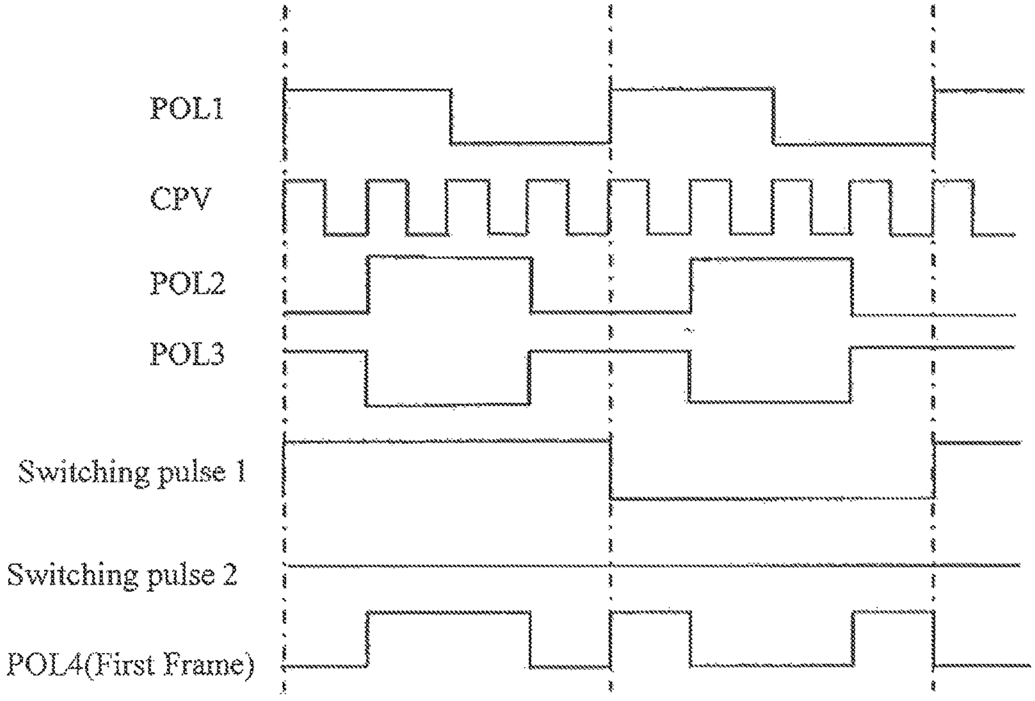
In FIG. 8, 8-*a*, 8-*b*, 8-*c* and 8-*d* are schematic timing charts of data polarity controlling signals generated in the first frame, the second frame, the third frame and the fourth frame during one polarity reversal period, respectively, wherein the driving apparatus as shown in FIG. 7 according to the first implementation of the present invention is applied.
Figure 8B:
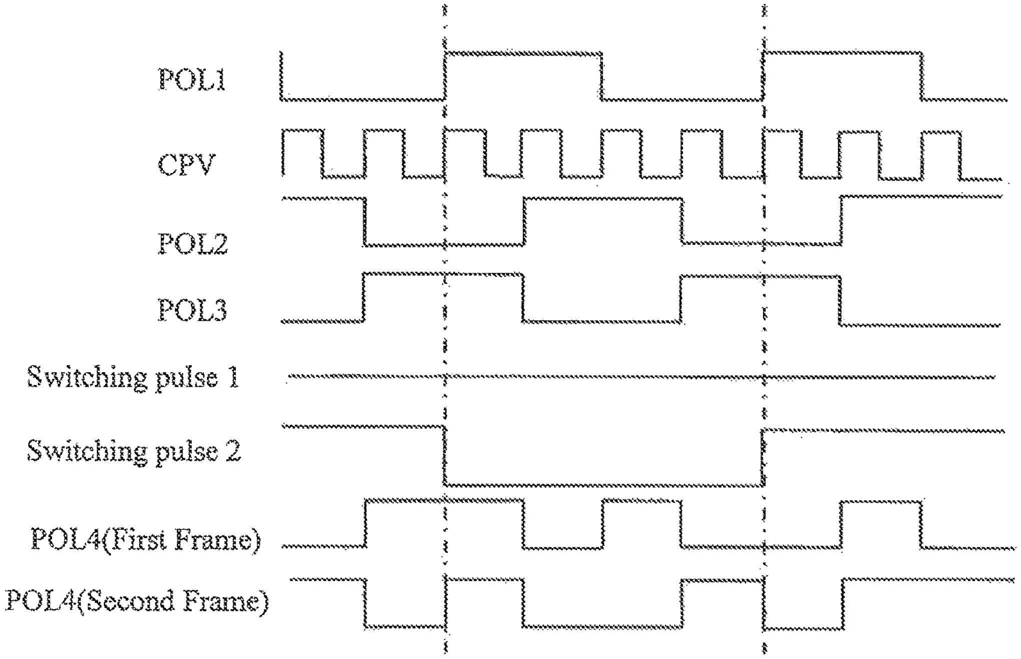
Figure 8C:
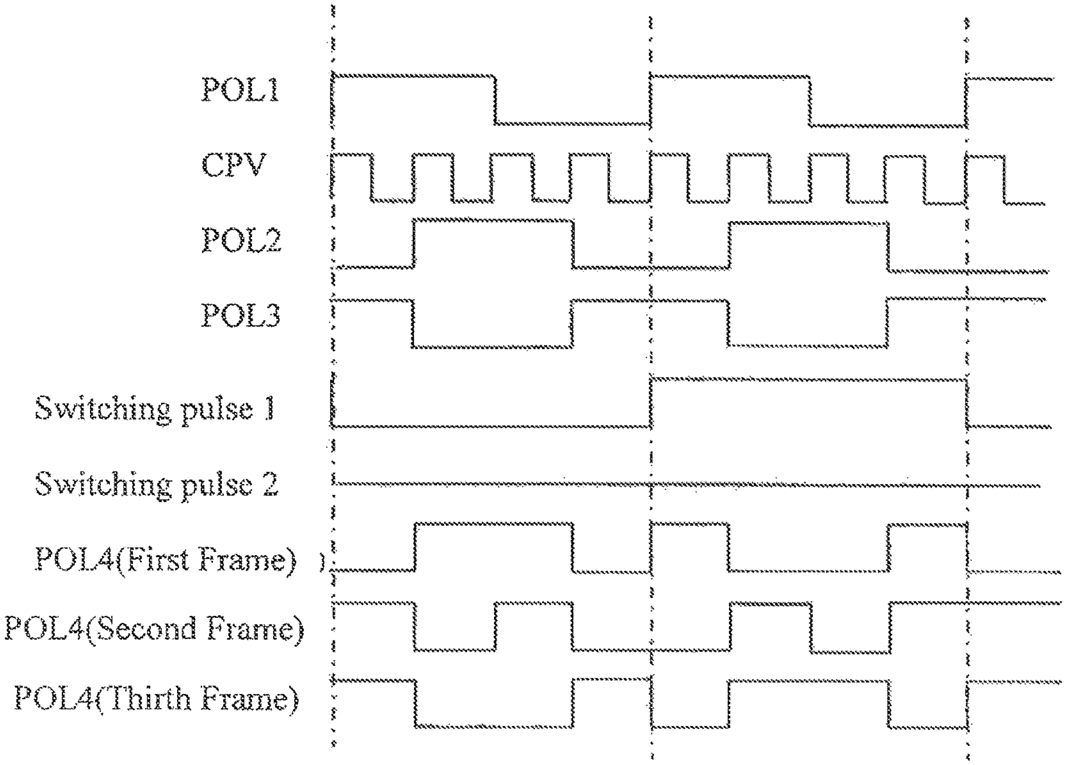
Figure 8D:
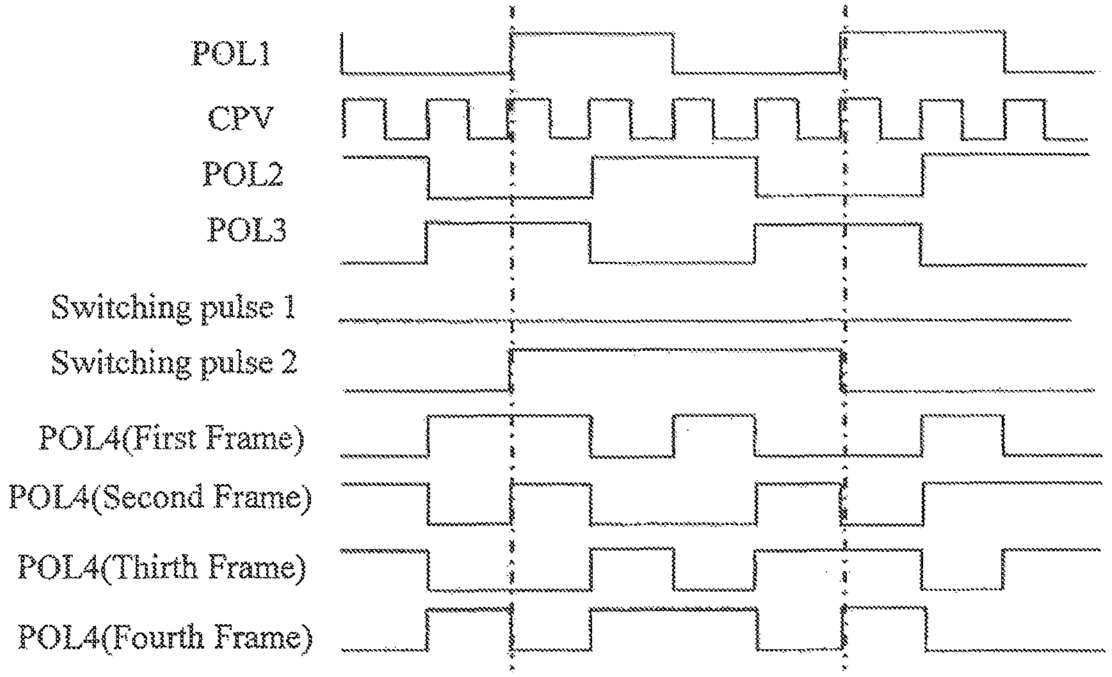

FIG. 7 illustrates a corresponding apparatus for implementing the above driving method of the embodiment of the present invention. The apparatus generates a polarity reversal signal POL4 and controls the polarities of the image data signal output from the source driver, wherein POL1, POL2 and POL3 are intermediary signals generated by different function module units in the apparatus and are used for generating the POL4. The apparatus comprises five units, that is, a timing controller 101, a signal delay unit 102, a polarity reversal unit 103, a signal polarity switching switch 104 and a source driver 105. The signal delay unit 102 receives a first polarity reversal signal POL1 and a timing signal clock CPV output from the timing controller 101 so as to generate a second polarity reversal signal POL2; the polarity reversal unit 103 receives the second polarity reversal signal POL2 output from the signal delay unit 102 so as to generate a third polarity reversal signal POL3; the signal polarity switching switch 104 alternatively switches the second polarity reversal signal POL2 and the third polarity reversal signal POL3 according to high, low levels of a switching pulse 1 and a switching pulse 2 output from the timing controller 101, to generate a fourth polarity reversal signal POL4 and outputs the same to the source driver 105; the source driver 105 outputs image data signals with positive polarity or negative polarity according to the high level or low level of the fourth polarity reversal signal POL 4, respectively, after receiving the POL4; wherein the periods of both the switching pulse 1 and the switching pulse 2 are same as one polarity arrangement period, and the timing controller alternatively outputs the switching pulse 1 and the switching pulse 2 in a unit of frame, and performs polarity reversal upon next outputting, in order to correspond to the generation and output of the fourth polarity reversal signal POL4 of respective frames in the four frames within the polarity reversal driving period.

FIG. 8, 8-*a*, 8-*b*, 8-*c* and 8-*d* show the schematic timing charts of the periodic polarity reversal control signal POL4 generated in the first frame, the second frame, the third frame and the fourth frame during one polarity reversal driving period according to the above embodiment of the present invention. During one polarity arrangement period of the first frame, as illustrated in FIG. 8-*a*, the second polarity reversal signal POL2 is delayed the first polarity reversal signal POL1 by a row scan clock period, the third polarity reversal signal POL3 and the second polarity reversal signal POL2 have the same waveforms but opposite polarities, the signal polarity switching switch 104 selects the second polarity reversal signal POL2 for outputting when the output of the switching pulse 1 is at a high level and selects the third polarity reversal signal POL3 for outputting when the output of the switching pulse 1 is at a low level so as to generate the fourth polarity reversal signal POL4 and control the polarities in the first frame, and the switching pulse 2 is no output until now. During the second frame, as illustrated in FIG. 8-*b*, the first polarity reversal signal POL1 output from the timing controller 101 is reversed in polarity, the switching pulse 2 is output but the switching pulse 1 is not output, the signal polarity switching switch 104 selects the second polarity reversal signal POL2 for outputting when the output of the switching pulse 2 is at a high level and selects the third polarity reversal signal POL3 for outputting when the output of the switching pulse 2 is at a low level so as to generate the fourth polarity reversal control signal POL4 of this frame. During the third frame, the first polarity reversal signal POL1 output from the timing controller 101 is reversed in polarity, the switching pulse 1 which is reversed with respect to that in the first frame is output and the switching pulse 2 is not output. The signal polarity switching switch 104 selects the second polarity reversal signal POL2 for outputting when the switching pulse 1 is at a high level and selects the third polarity reversal signal POL3 for outputting when the switching pulse 1 is at a low level so as to generate the polarity reversal control signal POL4 of the third frame. During the fourth frame, the first polarity reversal signal POL1 output from the timing controller 101 is reversed in polarity, the switching pulse 2 which is reversed with respect to that in the second frame is output and the switching pulse 1 is not output. The signal polarity switching switch 104 selects the second polarity reversal signal POL2 for outputting when the switching pulse 2 is at a high level and selects the third polarity reversal signal POL3 for outputting when the switching pulse 2 is at a low level so as to generate the polarity reversal control signal POL4 of the fourth frame. The same process is repeated when the next polarity reversal driving period starts, so that the polarity reversal driving method of the embodiment of the present invention is implemented.

For the driving apparatus illustrated in FIG. 7, the timing controller 101, the signal delay unit 102, the polarity reversal unit 103, and the signal polarity switching switch 104 may be integrated into one or more Integrated Circuits, or their respective functions may be integrated into the timing controller according to the timing shown in FIG. 8 and the polarity reversal control signal POL4 is output directly.

Second Implementation

Figure 9:
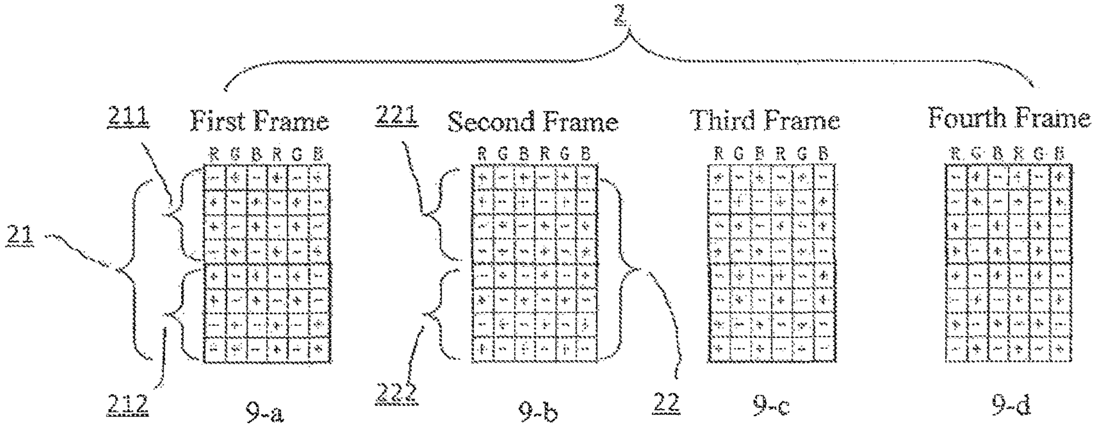
In FIG. 9, 9-*a* to 9-*d* are schematic views illustrating the frame polarity reversal manner of a second implementation of the present invention.

The second implementation of the present invention will be described by referring FIG. 9, Table 3, Table 4, FIG. 10 and FIG. 11 below. As illustrated in FIG. 9, one polarity reversal driving period (marked as 2) is composed of four frames, and the periodic polarity arrangement manners in the first frame, the second frame, the third frame and the fourth frame correspond to FIGS. 9-*a*, 9-*b*, 9-*c* and 9-*d*, respectively, wherein any one of the four frames may be a start frame of the polarity reversal driving period. In FIG. 9-*a*, the polarity arrangement is repeated in a period of eight rows (marked as 21) in a portrait direction (paralleled to a data signal line), wherein the first row to the fourth row compose a first unit 211, and the fifth row to the eighth row compose a second unit 212. For the first unit 211, the polarity arrangement in a same column (such as a red sub-pixel column R) is negative, positive, positive, negative, and for the second unit 212, the polarity arrangement in a same column (such as a red sub-pixel column R) is positive, positive, negative, negative. The polarities of the first unit 211 and the second unit 212 in the same column are summed to zero, while the polarities of neighbor sub-pixels in a same row are opposite. The second frame corresponds to the polarity arrangement manner in FIG. 9-*b*, and the polarity arrangement is repeated in a period of eight rows (marked as 22) in a portrait direction (paralleled to the data signal line), wherein the first row to the fourth row compose a first unit 221, and the fifth row to the eighth row compose a second unit 222. For the first unit 221, the polarity arrangement in a same column (such as a red sub-pixel column R) is positive, positive, negative, negative, and for the second unit 222, the polarity arrangement in a same column (such as a red sub-pixel column R) is negative, positive, negative, positive. The polarities of the first unit 221 and the second unit 222 in the same column are summed to zero, while the polarities of neighbor sub-pixels in a same row are opposite. The polarity arrangement manners corresponding to the third frame and the fourth frame are illustrated in FIG. 9-*c* and FIG. 9-*d*, which are obtained by reversing the polarities in FIG. 9-*a* and FIG. 9-*b*, respectively. Table 3 lists polarity accumulative magnitude differences between the data signals of two neighbor frames with respect to Vcom during one polarity arrangement period, when the common-used evaluation patterns A, B, C and D are displayed by the second implementation of the present invention and by the existing driving method. When the driving method of the embodiment of the present invention is used, a maximum difference of the polarity accumulative magnitudes between data signals of two neighbor frames with respect to the Vcom is 8V during one polarity arrangement period, while the maximum difference is 16V when the polarity reversal driving method of the prior art is used, thus the driving method of the embodiment of the present invention reduces the degree of coupling effect of the current frame on Vcom upon signal writing of the next frame, lightens a brightness disparity between the two neighbor frames, so that the deterioration degree of the flicker is lightened.

TABLE 3

| Evalution | polarity difference between two neighbor frames with respect to Vcom during one polarity arrangement period (absolute value) | | | |
|---|---|---|---|---|
| Pattern | The Second Implementation | 1 dot | 1 + 2 dot | 2 dot |
| Pattern A | 4 | 16 | 0 | 0 |
| Pattern B | 4 | 0 | 16 | 0 |
| Pattern C | 8 | 0 | 0 | 16 |
| Pattern D | 0 | 0 | 0 | 0 |
| Max | 8 | 16 | 16 | 16 |

TABLE 4

| Evaluation | average value of the polarity reversal numbers between two neighbor frames | | | |
|---|---|---|---|---|
| Pattern | The Second Implementation | 1 dot | 1 + 2 dot | 2 dot |
| Pattern A | 4 | 0 | 4 | 4 |
| Pattern B | 4 | 4 | 0 | 8 |
| Pattern C | 4 | 4 | 8 | 0 |
| Pattern D | 4 | 8 | 4 | 4 |
| Max | 4 | 8 | 8 | 8 |

Table 4 illustrates an alternating change numbers averaged in each frame between the pulling-up and the pulling-down for the Vcom due to the coupling of the polarities of the data signals in respective rows with respect to Vcom in one polarity arrangement period, when the common-used evaluation patterns shown in FIG. 2 are displayed by the second implementation of the present invention and the existing driving method. The maximum alternating change number for pulling the Vcom by the respective patterns is 4 as utilizing the driving method of the second implementation of the present invention, while the maximum alternating change number for pulling the Vcom by the respective patterns is 8 as utilizing the existing driving method. Because using the polarity arrangement and driving method of the present invention will reduce the alternating change number for pulling the Vcom due to coupling obviously, the green crosstalk or color offset phenomenon could be lightened effectively.

Figure 10:
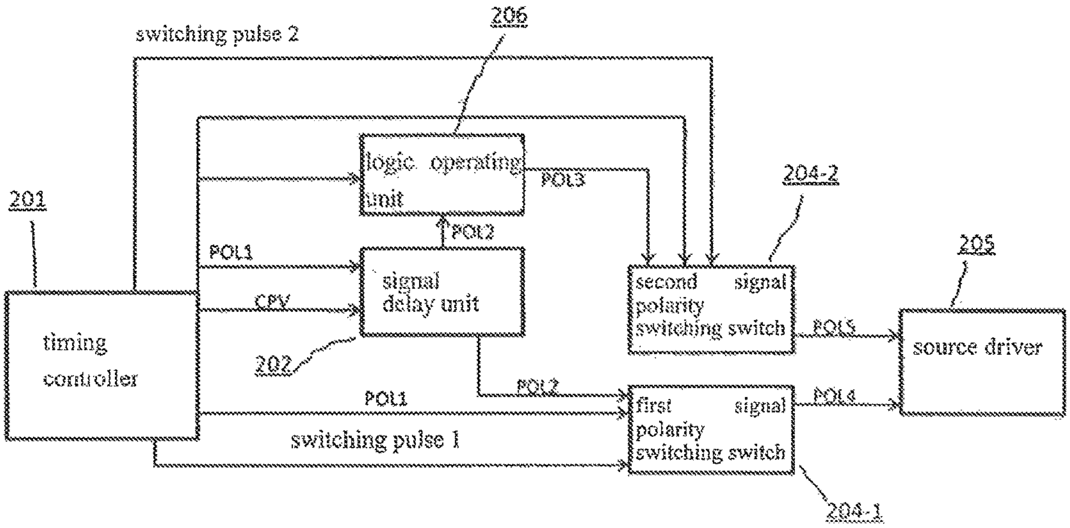
FIG. 10 is a schematic view illustrating a driving apparatus of the second implementation of the present invention.
Figure 11A:
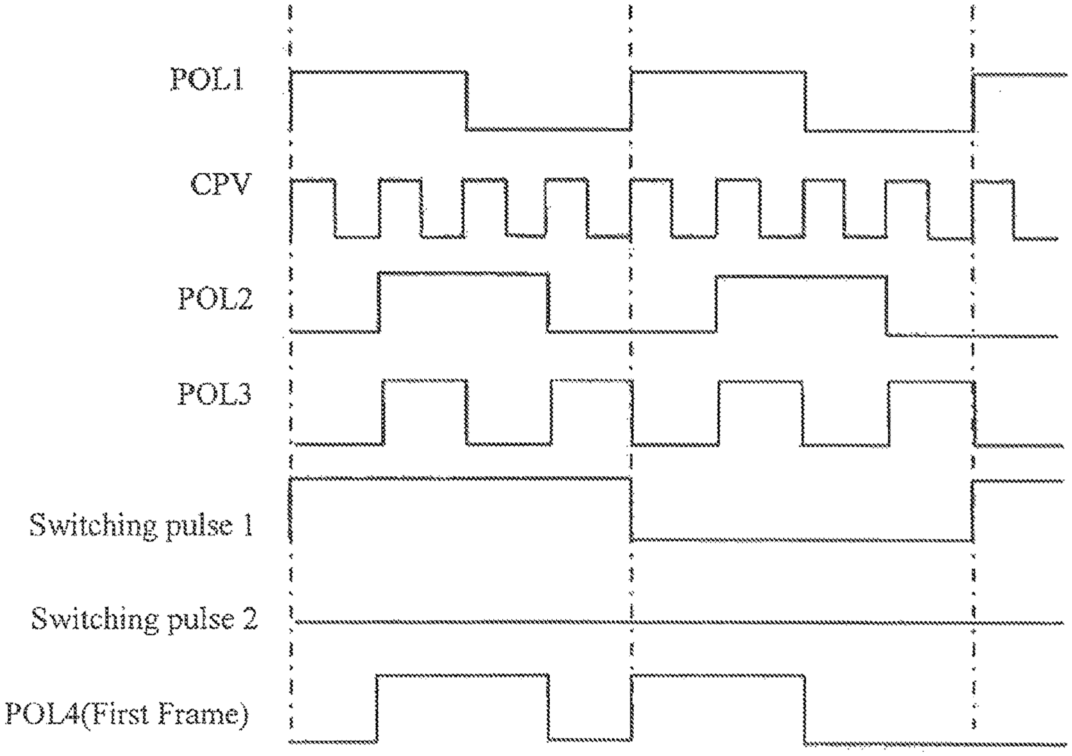
In FIG. 11, 11-*a*, 11-*b*, 11-*c* and 11-*d* are schematic timing charts of data polarity controlling signals generated in the first frame, the second frame, the third frame and the fourth frame during one polarity reversal driving period, respectively, where the driving apparatus as shown in FIG. 10 according to the second implementation of the present invention is applied.
Figure 11B:
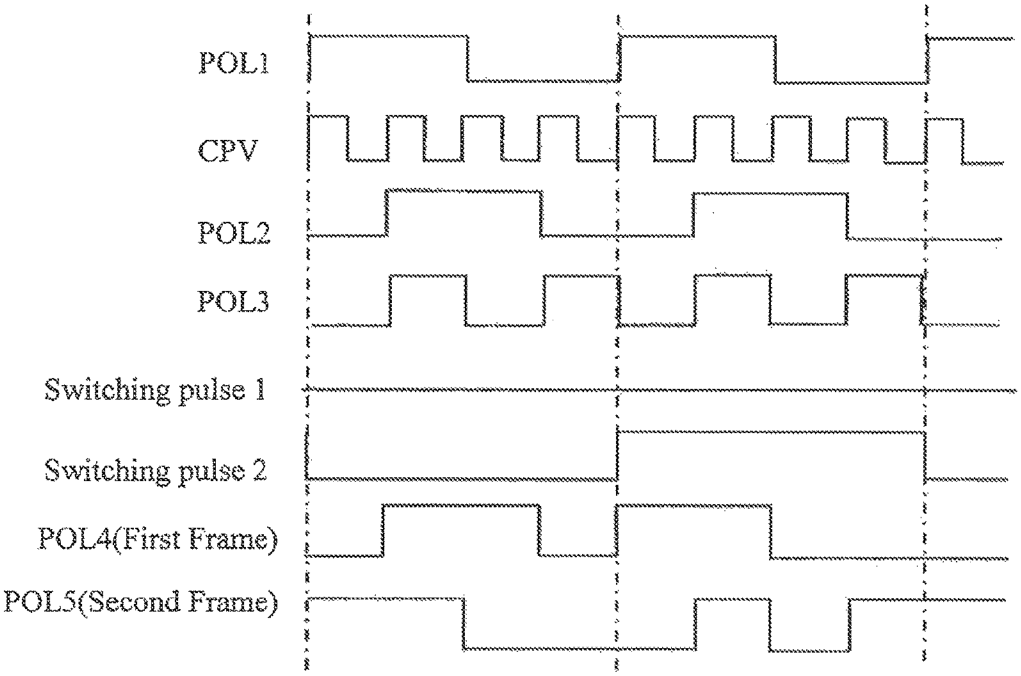
Figure 11C:
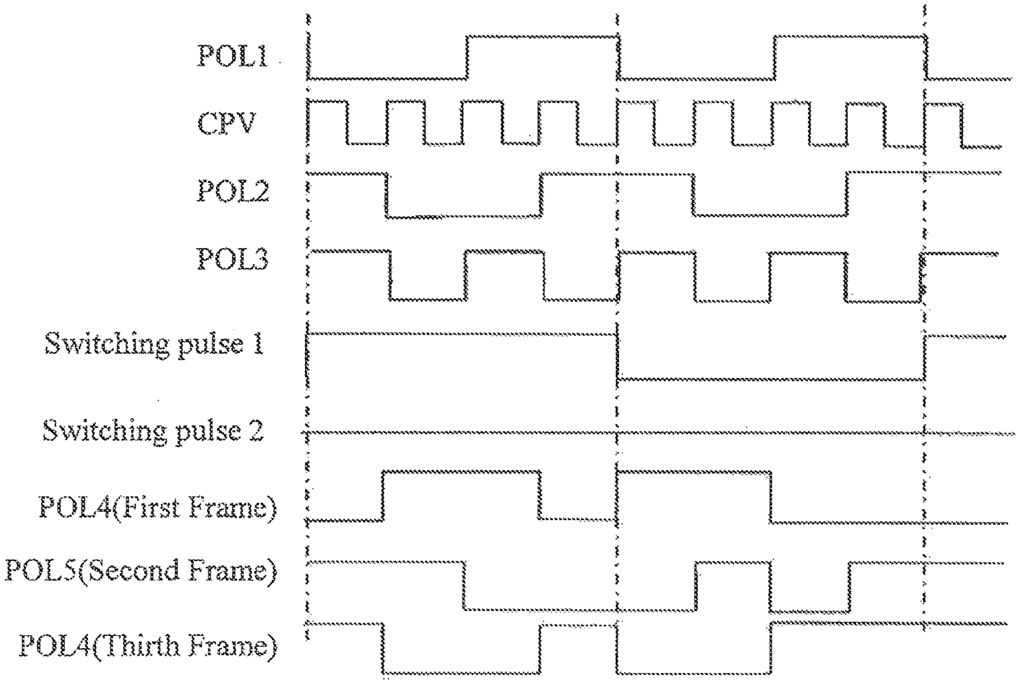
Figure 11D:
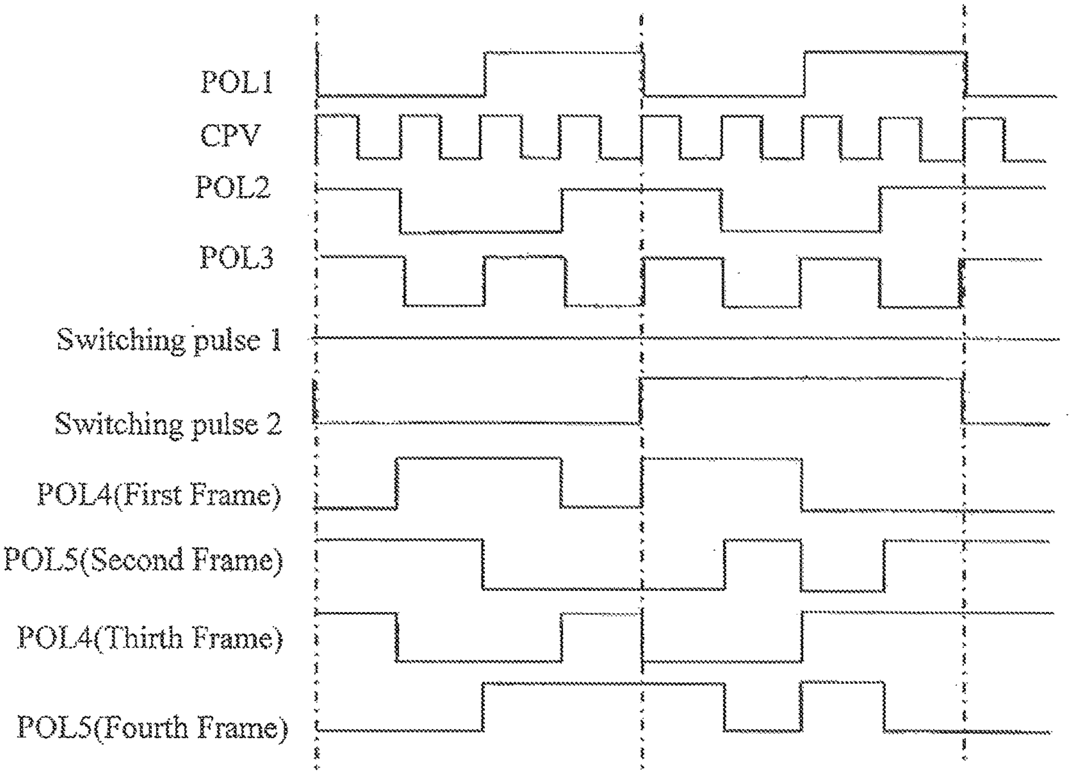

FIG. 10 illustrates a schematic view of a driving apparatus for implementing the second implementation of the present invention, and the apparatus generates two polarity reversal control signals POL4 and POL5, wherein the POL4 controls the polarities of the image data signals in the first frame and the third frame during one polarity reversal driving period, while the POL5 controls the polarities of the image data signals in the second frame and the fourth frame, wherein POL1, POL2 and POL3 are intermediary signals generated by different function module units in the apparatus and are used for generating the POL4 and POL5. The apparatus comprises a timing controller 201, a signal delay unit 202, a logic operating unit 206, a first signal polarity switching switch 204-1, a second signal polarity switching switch 204-2 and a source driver 205. The signal delay unit 201 receives a first polarity reversal signal POL1 and a timing signal clock CPV output from the timing controller 201 so as to generate a second polarity reversal signal POL2. The logic operating unit 206 receives the second polarity reversal signal POL2 output from the signal delay unit 202 and the first polarity reversal signal POL1 output from the timing controller 201 so as to generate a third polarity reversal signal POL3. The first signal polarity switching switch 204-1 alternatively switches the second polarity reversal signal POL2 and the first polarity reversal signal POL1 according to a high, low level of a switching pulse 1 output from the timing controller 201, generates a fourth polarity reversal signal POL4 and outputs the same to the source driver 205, in order to control signal output polarities of the first frame. The second signal polarity switching switch 204-2 alternatively switches the first polarity reversal signal POL1 and the third polarity reversal signal POL3 according to a high, low level of a switching pulse 2 output from the timing controller 201, generates the fifth polarity reversal signal POL5 and outputs the same to the source driver 205, in order to control signal output polarities of the second frame. The fourth polarity reversal signal POL4 and the fifth polarity reversal signal POL5 control signal output polarities of the third frame and the fourth frame, respectively, when the first polarity reversal signal POL1 output from the timing controller 201 is reversed in polarity. The timing controller 201 alternatively outputs the switching pulse 1 and the switching pulse 2 in a unit of frame, wherein the periods of the switching pulse 1 and the switching pulse 2 are the same as one polarity arrangement period.

FIGS. 11-*a*, 11-*b*, 11-*c* and 11-*d* illustrate, respectively, schematic timing charts of the periodic polarity reversal control signals POL4 and POL5 generated in the first frame, the second frame, the third frame and the fourth frame during one polarity reversal driving period according to the second implementation of the present invention. During the scan display of the first frame, as illustrated in FIG. 11-*a*, the timing controller 201 outputs the switching pulse signal 1 but does not outputs the switching pulse signal 2, and the first signal polarity switching switch 204-1 selects the second polarity reversal signal POL2 when the switching pulse signal 1 is at a high level and selects the first polarity reversal signal POL1 when the switching pulse signal 1 is at a low level so as to generate the fourth polarity reversal signal POL4 for outputting to the source driver 205 and control the signal output polarities in the first frame. During the scan display of the second frame, as illustrated in FIG. 11-*b*, the timing controller 201 outputs the switching pulse signal 2 and the first polarity reversal signal POL1 which is not in polarity reversed with respect to that in the first frame, but does not output the switching pulse signal 1. The second signal polarity switching switch 204-2 selects the third polarity reversal signal POL3 when the switching pulse signal 2 is at a high level and selects the first polarity reversal signal POL1 when the switching pulse signal 2 is at a low level so as to generate the fifth polarity reversal signal POL5 for outputting to the source driver 205 and control the signal output polarities in the second frame. During the scan display of the third frame, as illustrated in FIG. 11-*c*, the timing controller 201 outputs the switching pulse signal 1 and the first polarity reversal signal POL1 which is in polarity reversed with respect to that in the first frame, but does not output the switching pulse signal 2. The first signal polarity switching switch 204-1 selects the second polarity reversal signal POL2 when the switching pulse signal 1 is at a high level and selects the first polarity reversal signal POL1 when the switching pulse signal 1 is at a low level so as to generate the fourth polarity reversal signal POL4 for outputting to the source driver 205 and control the signal output polarities in the third frame. During the scan display of the fourth frame, as illustrated in FIG. 11-*d*, the timing controller 201 outputs the switching pulse signal 2 and the first polarity reversal signal POL1 which is in polarity reversed with respect to that in the first frame, but does not output the switching pulse signal 1. The second signal polarity switching switch 204-2 selects the third polarity reversal signal POL3 when the switching pulse signal 2 is at a high level and selects the first polarity reversal signal POL1 when the switching pulse signal 2 is at a low level so as to generate the fifth polarity reversal signal POL5 for outputting to the source driver 205 and control the signal output polarities in the fourth frame. The same process is repeated when the next polarity reversal period starts.

For the driving apparatus illustrated in FIG. 10, the timing controller 201, the signal delay unit 202, the logic operating unit 206, the first signal polarity switching switch 204-1 and the second signal polarity switching switch 204-2 may be integrated into one or more Integrated Circuits, or their respective functions may be integrated into the timing controller according to the timing shown in FIG. 11 and the polarity reversal control signals POL4 and POL5 are output directly.

Third Implementation-Fifth Implementation

Figure 12:
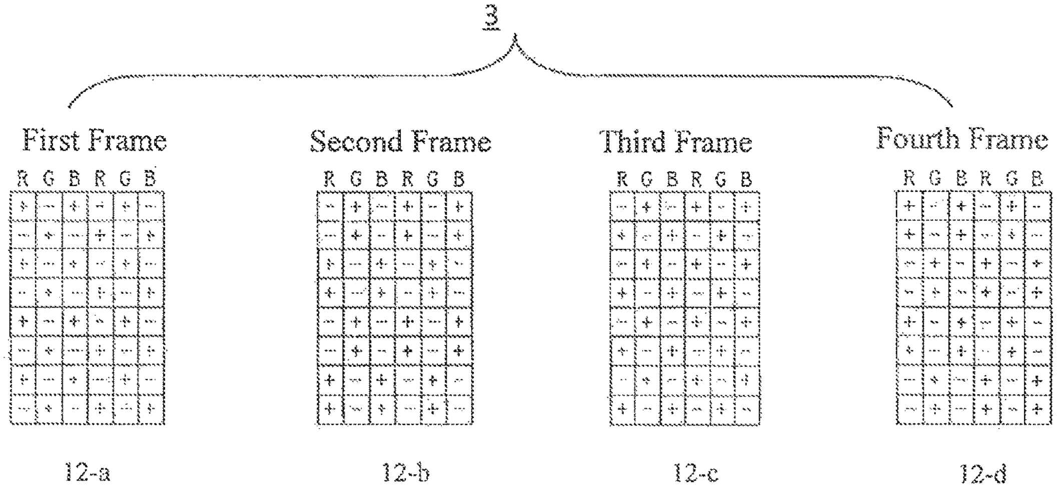
In FIG. 12, 12-*a* to 12-*d* are schematic views illustrating the frame polarity reversal manner of a third implementation of the present invention.
Figure 13:
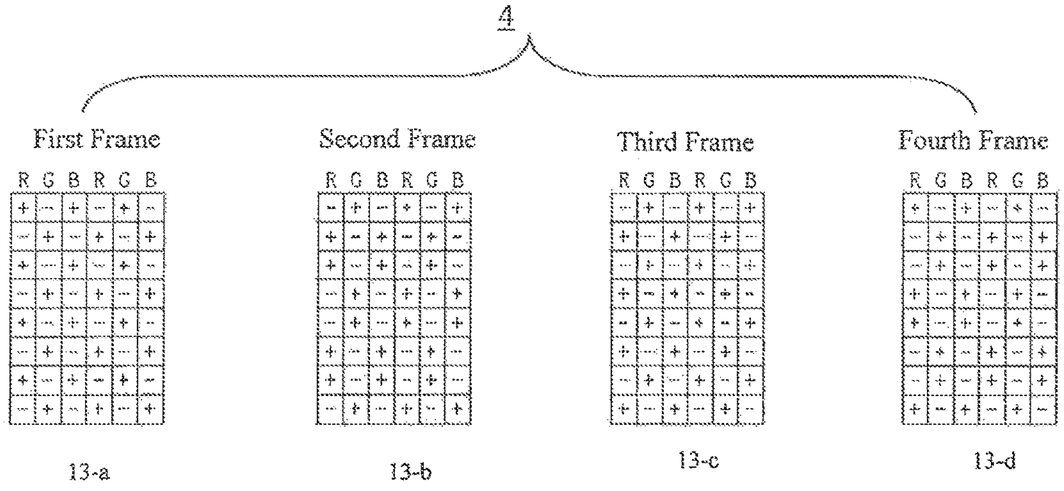
In FIG. 13, 13-*a* to 13-*d* are schematic views illustrating the frame polarity reversal manner of a fourth implementation of the present invention; and In FIG. 14, 14-*a* to 14-*d* are schematic views illustrating the frame polarity reversal manner of a fifth implementation of the present invention.
Figure 14:
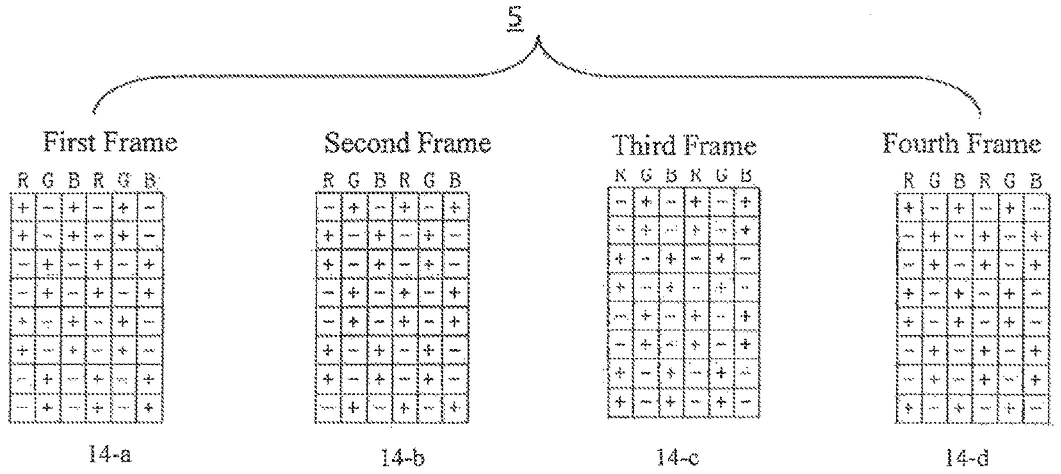

FIG. 12, FIG. 13 and FIG. 14 illustrate the third implementation, the fourth implementation and the fifth implementation according to the polarity reversal driving method of the present invention, wherein the polarity arrangement manners in two neighbor frames are different in any one of the implementations and are not reversed simply with each other as in the prior art. Table 5 lists comparison results, in one polarity arrangement period, of the polarity accumulative magnitude differences between the data signals of two neighbor frames with respect to Vcom, when the common-used evaluation patterns A, B, C and D as shown in FIG. 2 are displayed by the third implementation, the fourth implementation, the fifth implementation of the present invention and by the existing driving method, respectively. When the driving method of the embodiment of the present invention is used, a maximum difference of the polarity accumulative magnitudes between two neighbor frames is only 8V, which is smaller than 16V of the prior art, thus the deterioration degree of the flicker is lightened as displaying the above patterns. Table 6 illustrates an alternating change numbers between the pulling-up and the pulling-down for Vcom averaged in each frame due to the coupling to the Vcom from the polarities of the data signals in respective rows with respect to the Vcom during one polarity arrangement period, when the common-used evaluation patterns are displayed by the third implementation, the fourth implementation, the fifth implementation of the present invention and the existing driving method. The maximum alternating change number for pulling the Vcom by the respective patterns is 6 as utilizing the driving method of the third implementation and the fourth implementation of the present invention, and the maximum alternating change number of the fifth implementation is 4, and all of them are smaller than the maximum alternating change number for pulling the Vcom by the respective patterns as utilizing the existing driving method, which is 8. Because using the polarity arrangement and driving method of the embodiments of present invention will reduce the alternating change number for pulling the Vcom due to the coupling, the green crosstalk or color offset phenomenon could be lightened effectively.

TABLE 5

| Evaluation Pattern | polarity difference between two neighbor frames with respect to Vcom during one polarity arrangement period (absolute value) | | | | | |
|---|---|---|---|---|---|---|
| | Third Implementation | Fourth Implementation | Fifth Implementation | 1 dot | 1 + 2 dot | 2 dot |
| Pattern A | 8 | 8 | 0 | 16 | 0 | 0 |
| Pattern B | 0 | 8 | 8 | 0 | 16 | 0 |
| Pattern C | 8 | 0 | 8 | 0 | 0 | 16 |
| Pattern D | 0 | 0 | 0 | 0 | 0 | 0 |
| Max | 8 | 8 | 8 | 16 | 16 | 16 |

TABLE 6

| Evaluation Pattern | average value of the polarity reversal numbers between two neighbor frames | | | | | |
|---|---|---|---|---|---|---|
| | Third Implementation | Fourth Implementation | Fifth Implementation | 1 dot | 1 + 2 dot | 2 dot |
| Pattern A | 2 | 2 | 4 | 0 | 4 | 4 |
| Pattern B | 6 | 2 | 4 | 4 | 0 | 8 |
| Pattern C | 2 | 6 | 4 | 4 | 8 | 0 |
| Pattern D | 6 | 6 | 4 | 8 | 4 | 4 |
| Max | 6 | 6 | 4 | 8 | 8 | 8 |

For the third implementation, the fourth implementation and the fifth implementation of the present invention, the polarity reversal control signals of respective frames may be obtained by the timing controller alternating the output from every two frames and are in polarity reversed every two frames. Also, the signal output polarities in each of the frames may be controlled by the polarity signal delay unit, signal polarity switching unit and logic operating unit externally attached to the timing controller, just similar to the first implementation or the second implementation, and the details are omitted herein.

The above are only exemplary embodiments of the present invention, and please note that various changes and modifications may be made in these embodiments without departing from the spirit and scope of the present invention. Therefore, all the variation and alternations will fall into the scope of the present invention, which is defined in the appended claims.

What is claimed is:

1. A polarity reversal driving method for liquid crystal display panel, wherein a polarity reversal driving period comprises four frames and any one of the four frames can be a start frame, and images are scanned and displayed in a forward or backward order of the four frames; wherein during the polarity reversal driving period, the polarity arrangement manners of a first frame and a third frame are same, while their polarities are opposite; the polarity arrangement manners of a second frame and a fourth frame are same, while their polarities are opposite, and the polarity arrangement manner of the first frame is different from that of the second frame;

wherein for the polarity arrangement manner of the first frame and that of the second frame, there are two cases as follows:

case a) in which the polarity arrangement manner in a first column of the first frame is negative, positive, positive, negative, positive, negative, negative, and positive, and the polarity arrangement manner in a first column of the second frame is positive, negative, positive, negative, negative, positive, negative, and positive; and case b) in which the polarity arrangement manner in the first column of the first frame is negative, positive, positive, negative, positive, positive, negative, and negative, and the polarity arrangement manner in the first column of the second frame is positive, positive, negative, negative, negative, positive, negative, and positive;

the polarity reversal driving method comprises:

receiving a first polarity reversal signal and a timing signal clock to generate a second polarity reversal signal, wherein the second polarity reversal signal lags the first polarity reversal signal by a clock period of the timing signal clock;

performing a logic operation on the second polarity reversal signal to generate a third polarity reversal signal;

selecting a first switching pulse as an active switching pulse during the first frame;

selecting a second switching pulse as the active switching pulse during the second frame;

selecting the second polarity reversal signal or the third polarity reversal signal to generate a fourth polarity reversal signal when the active switching pulse is at a high level, and selecting the third polarity reversal signal or the first polarity reversal signal to generate the fourth polarity reversal signal when the active switching pulse is at a low level, wherein the forth polarity reversal signal is configured to control the polarity of the first column;

a period of the active switching pulse is equal to a polarity arrangement period, and a period of the first polarity reversal signal is half of the polarity arrangement period.

2. The method as claimed as claim 1, wherein the polarity is a polarity with respect to a pixel common electrode voltage.

3. The method of claim 1, wherein the polarity arrangement manner of each frame is arranged by eight rows as a polarity arrangement period, and in a same column, the sum of the polarities of a first unit composed of a first row, a second row, a third row, and a fourth row and those of a second unit composed of a fifth row, a sixth row, a seventh row, and a eighth row is 0, and neighbor columns in a same row have opposite polarities.

4. The polarity reversal driving method of claim 1, wherein in the case a), the method further comprises:

performing a logic inversion on the second polarity reversal signal to generate the third polarity reversal signal; and performing an inversion on the first polarity reversal signal during the second frame.

5. The polarity reversal driving method of claim 1, wherein in the case a), the method further comprises: selecting the second polarity reversal signal to generate the fourth polarity reversal signal when the active switching pulse is at the high level, and selecting the third polarity reversal signal to generate the fourth polarity reversal signal when the active switching pulse is at the low level.

6. The polarity reversal driving method of claim 1, wherein in the case b), the method further comprises:

performing a logic XNOR operation on the second polarity reversal signal during the first and second frames to generate the third polarity reversal signal.

7. The polarity reversal driving method of claim 1, wherein in the case b), the method further comprises:

selecting the first polarity reversal signal to generate the fourth polarity reversal signal when the active switching pulse is at the low level;

selecting the second polarity reversal signal to generate the fourth polarity reversal signal when the first switching pulse is selected as the active switching pulse and the first switching pulse is at a high level; and selecting the third polarity reversal signal to generate the fourth polarity reversal signal when the second switching pulse is selected as the active switching pulse and the second switching pulse is at a high level.

* * * * *